United States Patent [19]

Belser et al.

[11] Patent Number: 4,914,725
[45] Date of Patent: Apr. 3, 1990

[54] TRANSDUCER POSITIONING SERVO MECHANISMS EMPLOYING DIGITAL AND ANALOG CIRCUITS

[75] Inventors: Karl A. Belser, Los Gatos, Calif.; Paul J. Dounn, Tucson, Ariz.; Ian E. Henderson, Tucson, Ariz.; Ronald J. Kadlec, Tucson, Ariz.; Spencer D. Roberts, Tucson, Ariz.

[73] Assignee: International Business Machines Corporation, Armonk, N.Y.

[21] Appl. No.: 377,399

[22] Filed: Jul. 10, 1989

[51] Int. Cl.⁴ ............................................. G05B 13/00
[52] U.S. Cl. .................................... 318/560; 318/561; 318/563; 360/77.08; 360/77.06
[58] Field of Search ................................ 318/560–632; 360/75–78

[56] References Cited

U.S. PATENT DOCUMENTS

| | | | |
|---|---|---|---|
| 2,717,979 | 9/1955 | Gardiner | 318/19 |
| 3,458,785 | 7/1969 | Sordello | 318/576 X |
| 3,906,326 | 9/1975 | Chur | 318/594 |
| 3,924,268 | 12/1975 | McIntosh et al. | 360/78 |
| 4,123,779 | 10/1978 | Goldschmidt | 360/73.03 X |
| 4,149,200 | 4/1979 | Card | 360/77.08 |
| 4,149,201 | 4/1979 | Card | 360/77.08 |
| 4,300,080 | 11/1981 | Lee | 318/563 |
| 4,396,959 | 8/1983 | Harrison et al. | 360/77.08 |
| 4,724,370 | 2/1988 | Moraru et al. | 318/632 X |
| 4,745,588 | 5/1988 | Yoshikawa et al. | 360/77.06 X |
| 4,748,608 | 5/1988 | Matsumoto et al. | 360/77.07 X |
| 4,755,977 | 7/1988 | Abed | 360/77.04 X |

Primary Examiner—William M. Shoop, Jr.
Assistant Examiner—Paul Ip
Attorney, Agent, or Firm—Herbert F. Somermeyer

[57] ABSTRACT

A track-seeking system for an optical disk using a velocity control loop with partially-digitized velocity measurement. A quadrature signal is generated based on summing the halves of a position error signal to give directionality to track-crossing counts. A so-called piggy-back construction, wherein a fine positioner is carried by a coarse positioner, is employed. Feed-forward controls are provided from the fine to the coarse positioner. At track-capture time, the dynamic range of the fine positioner is momentarily increased.

27 Claims, 6 Drawing Sheets

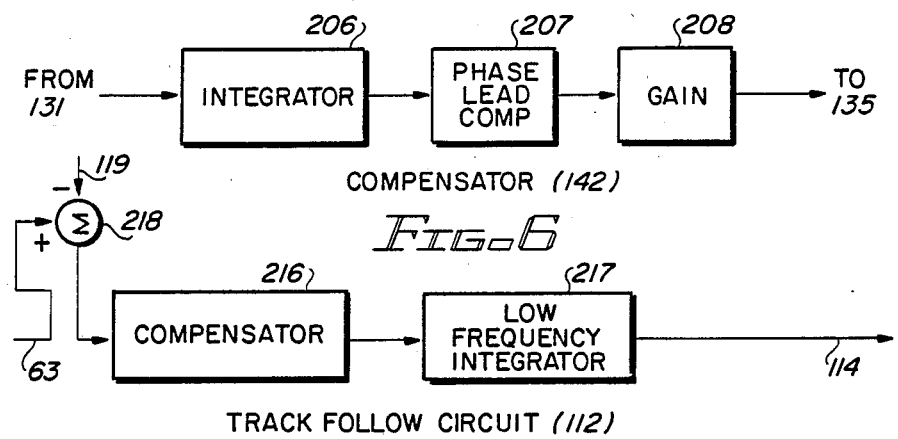
COMPENSATOR (142)
Fig. 6
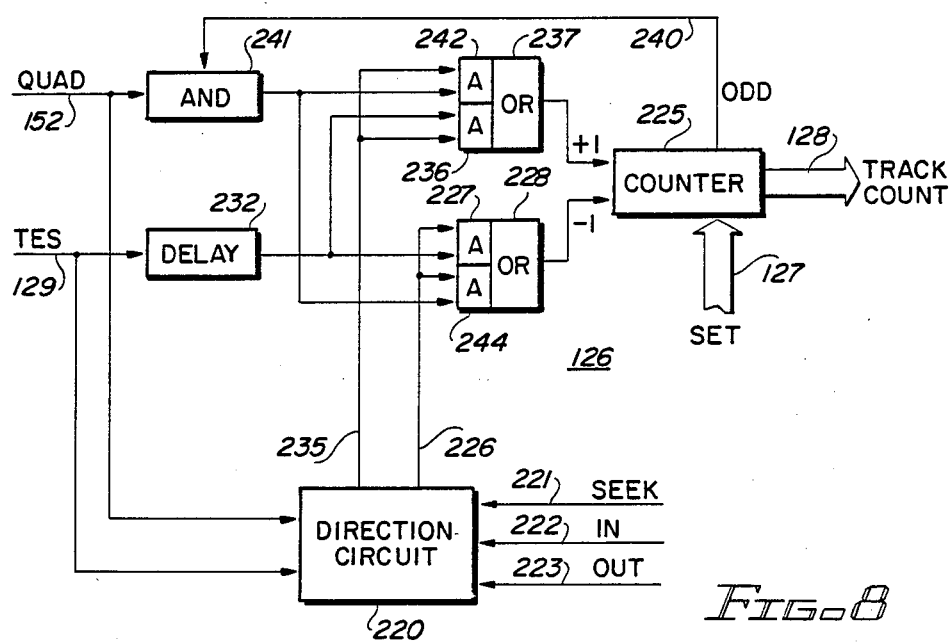
TRACK FOLLOW CIRCUIT (112)
Fig. 7
Fig. 8
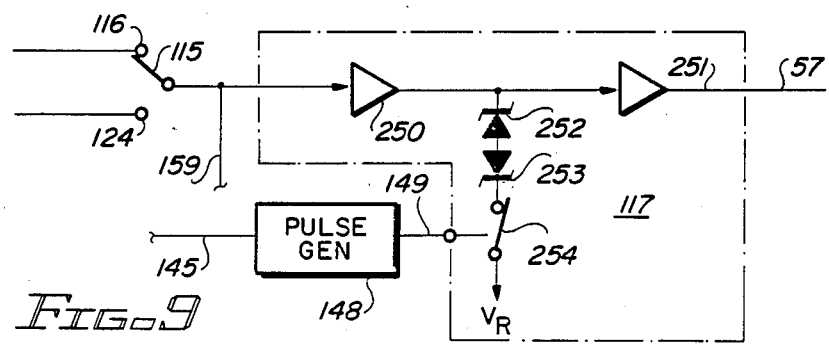
Fig. 9

TRANSDUCER POSITIONING SERVO MECHANISMS EMPLOYING DIGITAL AND ANALOG CIRCUITS

FIELD OF THE INVENTION

The present invention relates to position control systems, more particularly to those position control systems employing both digital and analog circuits.

BACKGROUND OF THE INVENTION

Disk recorders of either magnetic or optical type employ transducer positioning systems. Such transducer positioning systems often use a velocity servo loop for long transducer radial motions, termed seeks. Upon reaching a target track after leaving an origin track, the operation of the positioning systems switches from a velocity seek mode to a track following mode. In some instances, digital techniques are employed in the seeks while analog techniques are employed in the track following. Such a track following control may be favorably compared to (stop-lock) positioning control in other servo positioning applications. In a subsequent seek operation, the track following position mode is interrupted to return to a velocity loop control or a second positioning loop of another form, particularly when optical disk reliable track counting has been a continuing problem. One of the difficulties arises from the eccentricity in disk rotation combined with one micron intertrack spacing. Such so-called repeatable "runout" or "eccentricity of rotation" causes false direction of motion indications between a track being crossed and the absolute motion of the transducer. This problem increases at low radial speeds of the transducer. Accordingly, it is desired to provide for more reliable track seeking and control during the velocity portion of a track seek operation.

Another critical aspect of velocity servo control is the generation of a reliable velocity or speed indicating signal. The speed indicating signal often is derived from counting tracks as they are crossed, therefore, its reliability is dependent upon the reliability of the detection of track crossings by the transducer being moved. It is also desired to digitize portions of the track seeking and following system. Various techniques for enhancing the reliability of the positioning servo system while employing digital techniques are desired.

Optical recorders having the goal of high performance at low cost employ high performance servo positioning systems. The mechanical construction used in connection with these positioning systems is a so-called "fine servo," or actuator (also termed a secondary headarm or topping servo), is carried on a primary transducer or head-carrying arm which is radially movable by a so-called coarse actuator. The fine actuator is movably mounted by the coarse actuator to be servoed to a referenced position carried on the coarse actuator. Typically, the fine actuator has a high-frequency response characteristic for providing rapid and short-distance positioning motions of the transducer with respect to a track being followed or moving from one track to a second or target track that is relatively close to the one or origin track. The coarse servo which positions a relatively large mass primary head-carrying arm typically has low frequency characteristics for handling the longer moves. For optimizing the relationship for top performance between such fine and coarse actuators, positioning servo systems provide for the coarse actuator to always follow the fine actuator. Such arrangements have been colloquially called "piggy-back" carriage servo systems.

DISCUSSION OF THE PRIOR ART

The application of a piggy-back carriage system is not limited to disk recorders. Actually, the concept was established many years ago in a pattern following or template-controlled, coarse-fine positioning servo mechanism; see Gardiner U.S. Pat. No. 2,717,979. Such an arrangement enables higher production rates of a pattern-controlled machine, such as a welding or cutting machine. The carried fine, or secondary, actuator rapidly responds to sharp changes in the pattern template such that the welding or cutting operation faithfully follows the desired template pattern while overcoming only a minimal inertia of the pattern-controlled machine mechanisms. Gardiner teaches that the fine actuator, which Gardiner terms a "topping servo", is to be controlled by the absolute positioning of the pattern template; the coarse servo (Gardiner's main servo) is slaved to the topping servo for always following the positioning motions of the topping servo. Such an arrangement means that the rapidly-responding topping servo controls the pattern-controlled machine while the main servo follows the motions of the topping servo for maintaining the topping servo in an optimal position with respect to the main servo controlled carriage. This piggy-back arrangement is servo controlled for maximizing the range of operations of the topping or fine servo. This type of servo arrangement is also shown in Meyer U.S. Pat. No. 4,627,029. The patents, U.S. Pat. Nos. 3,924,268 to McIntosh et al., and 4,513,332 to Merritt et al., show magnetic disk recorders having piggy-back, head-positioning arrangements which are servo position controlled for optimizing the relative position of a fine actuator with respect to a coarse actuator.

Simons U.S. Pat. No. 3,924,063 shows yet another coarse-fine servo control wherein the fine actuator is permitted to move over a predetermined minimal distance before a coarse actuator operation is invoked. Van Winkle U.S. Pat. No. 4,191,981 shows fast and slow servo-positioning mechanisms in a multiple disk magnetic recorder in which the slow servo mechanism is slaved to a fast servo mechanism; the latter arrangement is not a piggy-back arrangement.

Because of the extremely high track density of optical disk recorders, the eccentricity or runout problems can be severe in track-seeking and track-following operations. For track following, the eccentricity is measured and stored in the table. The table stored values are then supplied to the positioning servo based upon rotational position such that the positioning servo responds to the measured eccentricity to follow the eccentricity in a feed-forward manner. One such runout compensator of many known ones is shown by Jacques et al. U.S. Pat. No. 4,135,217. During a seek, the eccentricity situation creates problems of reliable track counting. To this end, Sordello U.S. Pat. No. 3,458,785 teaches generating a so-called quadrature signal with respect to the tracking error signal such that the two signals in quadrature can be compared for determining the true relative direction of a head or transducer as it is crossing a track. Sordello records a first signal on a servo disk alternates in polarity as the head moves radially during a seek. A second signal is recorded on the disk in quadrature to the first signal resulting in a second generated signal providing a second alternating signal in quadrature or 90-degrees phase change with the first signal. As is well known, these two signals unambiguously provide an indication of relative direction of motion. The Sordello system works very well, but it requires the recording of two signals on the record disk. It is, therefore, desired to provide a lower cost system of quadrature signal generation only from scanning the surface of a grooved optical disk without adding special signals to such surface.

Another factor in transducer positioning is the rapidity of the seek; that is, it is desired to have as short an elapsed time as possible in seeking from an origin track to a target track. One of the aspects of this control is the acceleration of the transducer carriage system in the minimum time. Cormack U.S. Pat. No. 4,694,229 shows a positioning servo in which, during the initial, or acceleration phase, an acceleration feedback servo is employed for minimizing the acceleration time of the carriage system. When the speed, or velocity, of the carriage system reaches a design point, such as the midpoint of the seek distance, then a deceleration rate required to stop the carriage at a target or demand position is employed. The deceleration is optimized for the seek distance. The system is microprocessor controlled.

Abed et al. U.S. Pat. No. 4,627,038 shows a transducer or headpositioning system in which a low-speed, velocity-indicating signal is derived from a differentiated position error signal (also termed "tracking error signal" or TES in some references). The output of the differentiator is applied to a blanking circuit, which disconnects the steep-slope portion of the position error signal from a sample and hold circuit. As shown in Abed, a medium-speed velocity signal is derived from the integral motor current; on a long seek, a high-speed velocity signal is derived by digitally counting several track crossings in the position error signal. In this patent, there is one servo positioning track for a band of data tracks. It is desired to avoid this type of arrangement, i.e., enable the tracking system to track on the data track and not require a separate servo positioning track. It is parenthetically noted that at the time of the Abed et al. patent, it was well known to count tracks and measure the number of tracks counted during a period of time for indicating radial velocity of a moving transducer. Hashimoto in U.S. Pat. Nos. 4,636,883 and 4,622,604 shows a digital circuit for generating a velocity-indicating signal. In this system, a microprocessor calculates, based upon the target track address set in the target track register, the target velocity of the seek operation of a magnetic head as it moves toward a target track. When the target velocity of the magnetic head is comparativey large, the microprocessor increases the revision interval of the target velocity based upon the pre-stored programs such that the interval is larger than a so-called "normal revision" interval. During each revision interval, the velocity is changed once. The microprocessor varies the target velocity revision interval by a pulse-signal output from a circuit, which divides a track-pulse count by one-half. At lower velocities, the pulse-track count is not frequency divided. A threshold velocity causes the microprocessor to switch the frequency division of the track pulse count interval by two, for example.

Two references which show counting tracks for generating a velocity signal include U.S. Pat. No. 4,333,117 by Bruce Johnson and IBM TECHNICAL DISCLOSURE BULLETIN article entitled "Track Seek Using Continuous Servo" by Hansen et al., Volume 25 No. 9, Feb. 1983, pages 4572–4576. The latter article also shows a typical velocity profile on page 4574 for velocity-controlled servos.

Another problem associated with rapid but reliable transducer-positioning motions is the so-called capture of the target track by the moving carriage system. It is desired to move the transducer to the center of the target track without or minimum overshot in a minimal time. It is well known that in so-called "bang-bang" servos, the first bang moves the item or carriage toward a target position, while the second bang breaks the carriage or member being moved, such that it stops somewhere near a target position.

Tightly-controlled, servo-positioning systems, particularly those employing velocity control loops, have provided several techniques of varying complexity for insuring reliable track capture. For example, Iftikar et al., U.S. Pat. No. 4,030,132 provides a feed-forward signal to the positioning servo system in a so-called compensatory mode for optimally moving the transducer towards the center of the target track. Iftikar also teaches that in the prior art. The bandwidth of the servo was substantially increased by increasing the servo gain for reducing overshot upon imminent target track crossing for facilitating track capture. Scarrott et al. U.S. Pat. No. 3,736,485 employs a near-zero detector (near target track), which causes the low-frequency portion of the drive signal to be cut off and allows only the high-frequency portion. This means that a faster sample rate of the error signal is provided as the carriage system approaches the target track for maintaining a more precise velocity control of the carriage system and thereby ensuring reliable track capture. On the other hand, Palombo et al. U.S. Pat. No. 3,696,354 teaches that to obtain good track capture, one switches in additional feedback, while sensing the position of the carriage with respect to the track center line, while producing an additional control signal to ensure track capture. Hsieh et al. U.S. Pat. No. 4,432,082 teaches that for a reliable track capture the servo is made to respond to velocity and position indicating signals for instituting track following. It is desired to obtain reliable track capture with a simpler and lower cost mechanism than that shown in the cited prior art.

SUMMARY OF THE INVENTION

It is an object of the invention to provide a highly-digitized, positioning control loop that provides for rapid and reliable positioning motions.

In accordance with the invention, for more accurately controlling the positioning servo system, a positioning servo system has a digitized-velocity or speed-signal generating means, in which the sample period of the position error signal is varied in accordance with a velocity profile and a gain of the digital circuits is adjusted, also in accordance with the velocity profile, for providing optimum operation of the digitized portion of the velocity signal generator. In another aspect of the velocity-signal generation, the same digital circuit generates a velocity reference signal and a velocity error signal from a common desired velocity profile set of values.

In another aspect of the invention, during an acceleration phase, a substantial acceleration boost is provided to a fine carriage, or actuator, carried by a coarse actuator, or carriage. This acceleration boost is transferred through a feed-forward circuit from the fine carriage to a servo loop actuating the coarse servo such that the acceleration boost is simultaneously applied to both actuators, but in a manner solely determined by the fine actuator servo controls.

It is another aspect of the invention to facilitate track capture by momentarily increasing the dynamic range of the power amplifier driving the transducer radial position actuator.

It is as yet another aspect of the present invention to provide a quadrature signal for controlling the velocity control signals and track counting by generating a tracking error signal based upon light reflected from a record medium which indicates a positional-system-positional relationship of an optical transducer with respect to the medium using a difference of two signals. At the same time, a quadrature signal is generated by summing the two signals used to indicate a radial position. The quadrature signal is compared with the error signal for indicating direction of relative motion for each of the tracks being crossed.

The foregoing and other objects, features, and advantages of the invention will be apparent from the following more particular description of preferred embodiment of the invention, as illustrated in the accompanying drawings.

BRIEF DESCRIPTION OF THE DRAWINGS

FIG. 6 is a simplified block diagram illustrating a compensator for use with the FIG. 3-illustrated embodiment.

FIG. 7 is a simplified block diagram of a track-following loop used in connection with the FIG. 3-illustrated servo system.

FIG. 8 is a simplified diagram illustrating digital counting of tracks using a quadrature signal.

FIG. 9 is a simplified circuit diagram illustrating a track-capture control circuit which is used with the FIG. 3-illustrated servo positioning systems.

DETAILED DESCRIPTION

Figure 1:
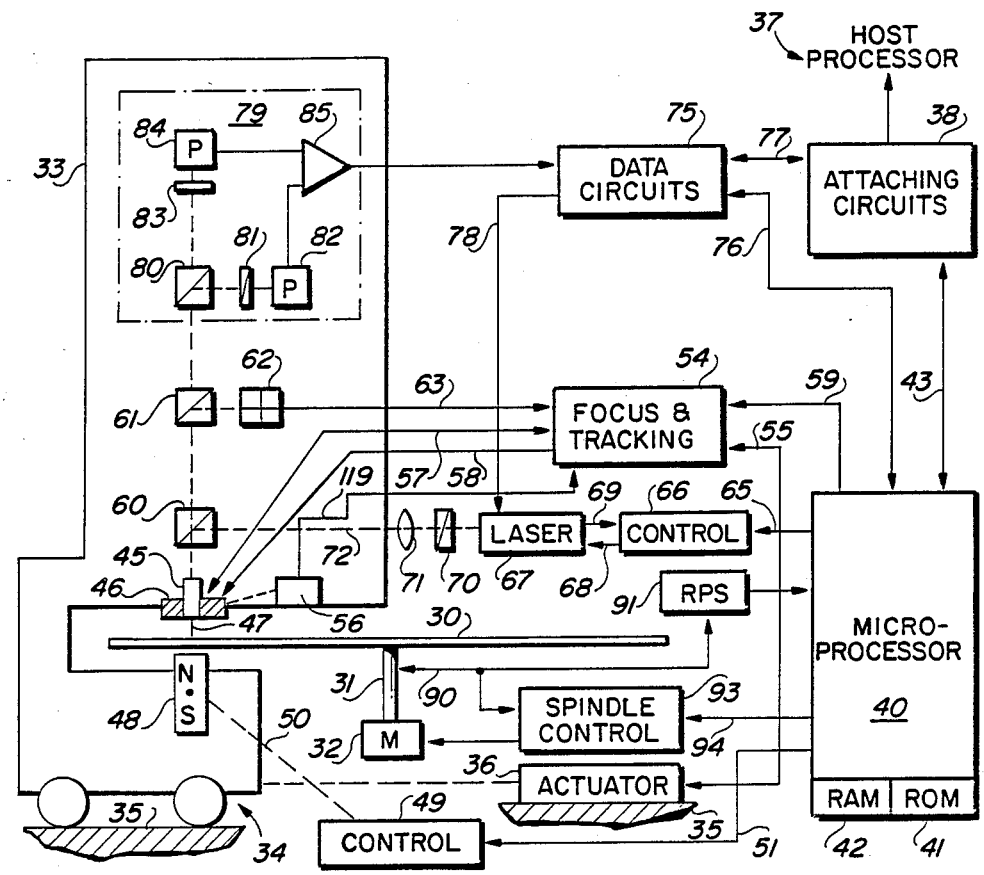
FIG. 1 is a simplified block diagram of an optical disk recorder employing the present invention.

Referring now to the drawing, like numerals indicate like parts and structural features in the figures. An optical recorder with which the present invention may be advantageously employed is shown in FIG. 1. A magnetooptic record disk 30 is mounted for rotation on spindle 31 by motor 32. Optical head-carrying arm 33 on headarm carriage generally denoted by numeral 34 moves radially of disk 30. A frame 35 of recorder suitably mounts carriage 34 for reciprocating radial motions. The radial motions of carriage 34 enable access to any one of a plurality of concentric tracks or circumvolutions of a spiral track for recording and recovering data on and from the disk. Linear actuator 36 suitably mounted on frame 35, radially moves carriage 34 for enabling track accessing. The recorder is suitably attached to one or more host processors 37, such host processors may be control units, personal computers, large system computers, communication systems, image signal processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random-access memory (RAM) 42.

The optics of the recorder include an objective or focusing lens 45 mounted for focusing and radial tracking motions on headarm 33 by fine actuator 46. This actuator includes mechanisms for moving lens 45 toward and away from disk 30 for focusing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnet 48 in a constructed embodiment (magnet 48 is an electromagnet) provides a weak magnetic steering field for directing the remnant magnetization direction of a small spot on disk 30 illuminated by laser light from lens 45. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on disk 30 normally are "north pole remnant magnetization". To erase disk 30, magnet 48 rotates so the south pole is adjacent disk 30. Magnet 48 control 49, which is operatively coupled to rotatable magnet 48 as indicated by dashed line 50, controls the write and erase directions. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the fine actuator 46 control by circuits 54 is exercised through control signals travelling to fine actuator 46 over lines 57 and 58, respectively for effecting respective focus and track following and seeking actions. Sensor 56 senses the relative position of fine actuator 46 to headarm carriage 33 to create a relative position error (RPE) signal. Line 57 consists of two signal conductors, one conductor for carrying a focus error signal to circuits 54 and a second conductor for carrying a focus control signal from circuits 54 to the focus mechanisms in fine actuator 46.

The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photoelements which respectively supply signals on four lines collectively denominated by numeral 63 to focus and tracking circuits 54. Aligning one axis of the detector 62 with a track center line, track following operations are enabled. Focusing operations are achieved by comparing the light intensities detected by the four photoelements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser, such as a gallium-arsenide diode laser, can be modulated by data signals so the emitted light beam represents the data to be recorded by intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplying suitable control signals over line 76. Microprocessor 40 in preparing circuits 75 is responding to commands for recording received from a host processor 37 via attaching circuits 38. Once data circuits 75 are prepared, data is transferred directly between host processor 37 and data circuits 75 through attaching circuits 38. Data circuits 75, also ancillary circuits (not shown), relating to disk 30 format signals, error detection and correction and the like. Circuits 75, during a read or recovery action, strip the ancillary signals from the readback signals before supply corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the headarm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photocell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photocell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal-controlled oscillator for controlling motor 32 speed, as is well known. Microprocessor 40 supplies control signals over line 94 to control 93 in the usual manner.

Figure 2:
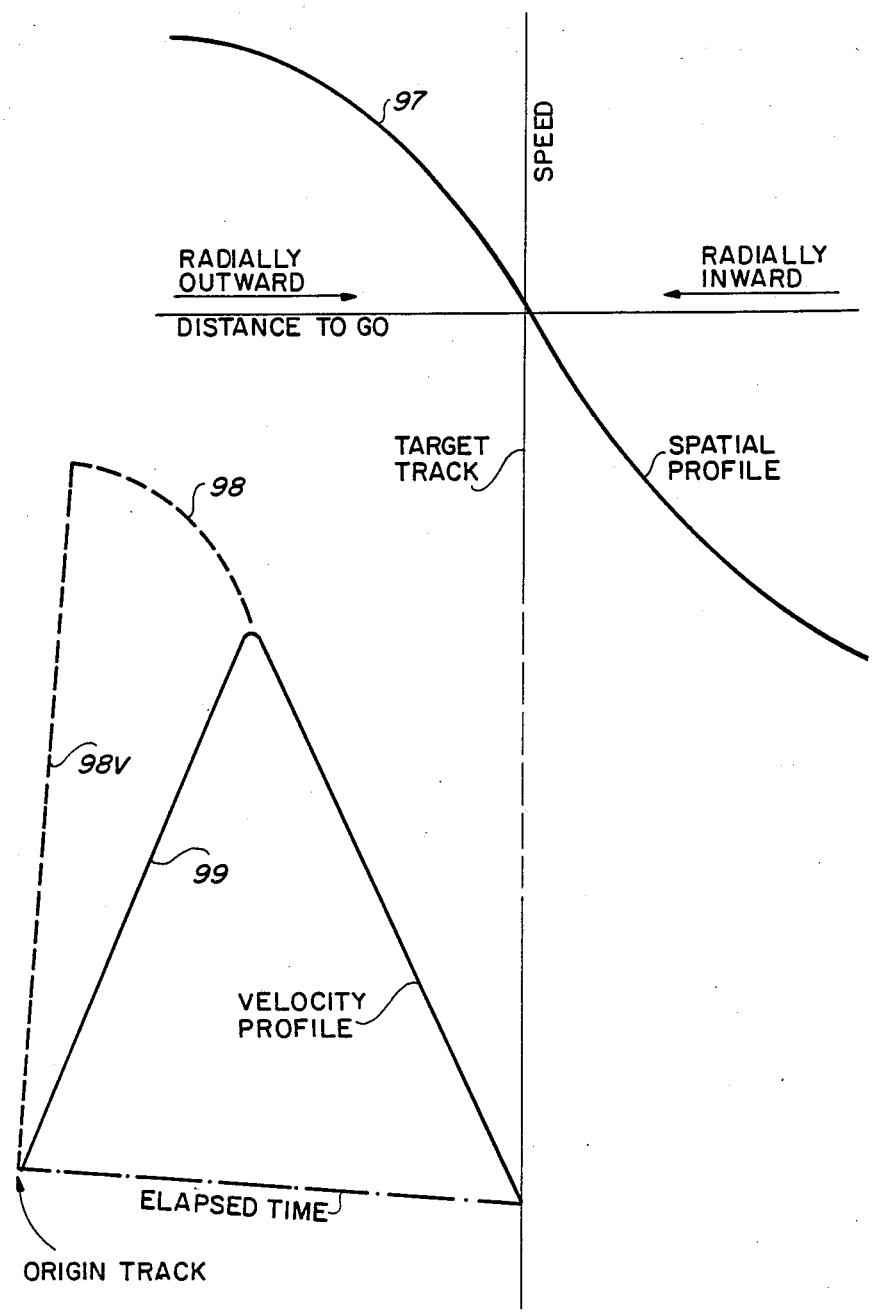
FIG. 2 is a set of two graphs illustrating the velocity profile of a transducer system.

FIG. 2 illustrates a desired velocity profile used in connection with later-described servo positioning circuits. The desired velocity profile for approaching a target track is illustrated by curve 97. Radially-outward motions of head carriage 33 with respect to disk 30 is shown by the radially-outward labelled arrow while the radially-inward, desired velocity profile is shown by moving along curve 97 in the direction of the radially-inward labelled arrow. The vertical ordinate represents the targt track. The speed of the carriage is also indicated by the vertical ordinate. The translation of the curve 97 into an actual seek movement is shown by curves 98 and 99 which end at the target track indicating vertical ordinate. The start or origin track is represented at the vertical portion 98V of the dashed line 98 which indicates optimally there should be instantaneous acceleration of the carriage system. This is physically impossible, therefore, curve 99 is followed for accelerating from the origin track to a point wherein the actual velocity or speed of the carriage system intersects the dashed line 98. At this point, the acceleration phase, which should be minimized in time, is completed. The elapsed time relationship of the intersection point of curves 98, 99 as measured between the origin track and the target track is shown in FIG. 2. This intersection point, not necessarily at the midpoint between the origin track and the target track, depends upon the capabilities of the carriage in terms of speed and the spacing between origin and target tracks. In some servo positioning systems, the distance to go may exceed the idealized curve 99 for minimizing transit time between the origin and target tracks. In this instance, a maximum speed will be employed resulting in a horizontal line in the velocity profile of the servo.

Figure 3:
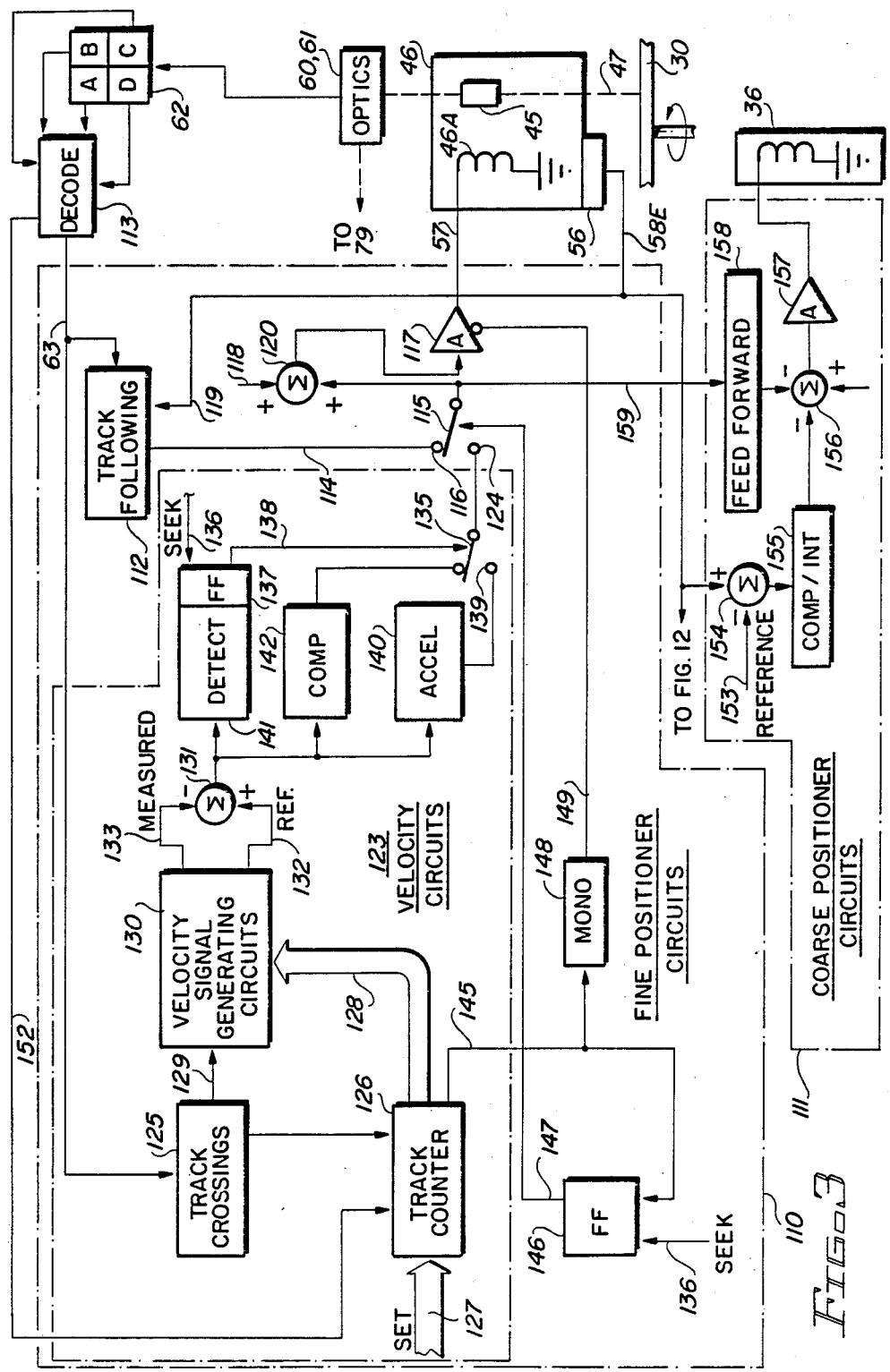
FIG. 3 is a simplified block diagram of the servo loops embodying the present invention showing the acceleration control, seek-velocity-signal-generation control, track capture and faithful coordination of a fine and coarse actuator servos.

FIG. 3 illustrates the seeking and track-following portions of focus and tracking circuits 54. The tracking and seeking portions include fine actuator 46 positioning circuits 110 and coarse positioner 36 servo circuits 111. The coarse positioner circuits 111 operate such that the coarse actuator 36 always moves the headarm 33 to follow the motions of fine actuator 46. Fine positioner circuits 110 actuate actuator 46 to move objective lens 45 such that a laser beam traveling along light path 47 scans a single track during track-following operations and moves radially of the disk 30 for crossing the tracks during a track-seek operation. For track-following operations, track-following circuit 112 receives a sensed tracking error signal TES over line 63 from decoder 113 to provide a track-following control signal over line 114. The line 114 control signal then passes through electronic switch 115, entering at track-follow terminal 116, for controlling power output amplifier 117. A disk profile is generated for the disk 30 which indicates the expected repeatable radial runout. Summation circuit 120 adds the radial runout indicating signal to the control signals received from electronic switch 115 for adding radial runout to both the track following and seeking control signals supplied through power amplifier 117 to provide more accurate track following and seeking. Power amplifier 117 supplies the radial runout compensated actuating signal over line 57 to actuator coil 46A of fine actuator 46. The drive current on line 57 causes fine actuator 46 to move radially along the headarm 33 for maintaining the position of the light beam 47 on a single track.

The quad detector 62 has independent photoresponsive elements A, B, C and D arranged in a rectangular array to provide tracking error-indicating, photoelement signals to decode circuit 113. The axis of the rectangle of quad detector 62 lying between paired photoelements A, B and D, C is aligned with the axis of the track being followed. Decode circuit 113 responds to the four photoelement signals to provide a tracking error signal, as is well known and as later described herein. In track-following circuit 112, the tracking error signal actuates servo circuits in a known manner. Additionally, relative sensor 56 mounted on headarm 33 senses relative displacement error between fine actuator 46 and headarm 33. Sensor 56 supplies a relative position displacement error signal (RPE) over line 58E, thence line 119, to track-follow circuits 112 for modifying the TES offset. Such offset is caused by relative motion of coarse carriage 33 with fine carriage or actuator 46. The offset is compensated by feeding the RPE signal from sensor 56 to fine actuator 46.

Velocity seek loop circuits, generally denoted by numeral 123, constitute all of the electronic circuits providing a signal to the seek input terminal 124 of seek-follow switch 115. Whenever a seek is instituted by microprocessor 40, electronic switch 115 is moved from terminal 116 to terminal 124 for disconnecting the track-following circuit 112 from amplifier 117 and connecting the velocity-servo loop circuits 123 to amplifier 117.

Circuits 123 respond to several input signals for effecting a velocity-controlled seek. Track-crossing circuit 125 receives the sensed TES signal over line 63 for detecting when the beam 47 is crossing a track (see FIG. 11 for track details) on disk 30. Each time a track crossing is detected by circuit 125, an output decrementing pulse is supplied to track counter 126 for decrementing one from the number of tracks to go. It may be noted that in some embodiments, a single track crossing is represented by two zero crossings of the tracking error signal on line 63 such that two pulses are provided to the track counter for indicating a single track crossing. At the time microprocessor 40 actuates circuits 110 to do a seek, microprocessor 40 supplies the number of tracks to be crossed over bus 127 (part of line 59 of FIG. 1) presetting track counter 126 for the upcoming seek operation. Track counter 126 continuously outputs the number of tracks-to-go over bus 128 to velocity circuits 130. Velocity circuits 130 respond to a velocity profile designed for the seek operation for generating a reference signal and a measured speed indicating signal. The speed reference signal supplied over line 132 is based upon the velocity profile desired for the seek operation and the instant distance to go in the tracks to be crossed. The measured speed signal is supplied over line 133 to be subtracted from the said reference signal on line 132 by sum circuit 131. The resultant speed error signal supplied by sum circuit 131 alters the operation of fine actuator 46 to closely follow the velocity profile. Operation of velocity signal-generating circuits 130 are described later.

Circuits 123 also include a gain control circuit which includes gain control switch 135 having its output terminal connected to the seek terminal 124 of switch 115. Switch 135 is actuated to an acceleration position 139 whenever microprocessor 40 supplies a SEEK signal over line 136 (line 136 is shown as two different line positions in FIG. 3 for purposes of simplifying the drawing). The SEEK signal sets flip-flop FF 137 to the inactive state causing FF 137 to supply a switch-actuating signal over line 138 to move switch 135 to connect acceleration terminal 139 to seek terminal 124 of switch 115. Acceleration circuit ACCEL 140 provides high gain to the sum circuit 131 error signal; that is, the error signal is accentuated by ACCEL circuit 140 for initially maximizing the drive power to coil 46A of fine actuator 46. This acceleration high-gain portion minimizes the time it takes the fine actuator 46 to move beam 47 to a speed or velocity corresponding to the desired velocity profile. Once the velocity profile and the actual velocity are the same, then detector circuit 141 detects a small error signal supplied by sum circuit 131. At this time, detector circuit 141 resets FF 137 to the active state for supplying an activating signal over line 138 for switching switch 135 from terminal 139 to receive signals now from seek compensator circuit COMP 142. Compensator circuit 142 is designed, as is known, to maximize velocity servo operation whenever the reference velocity profile and the measured velocity have a small error condition. Circuit 142 if used during acceleration, could saturate thereby preventing maximum desired acceleration. Compensator 142 continues to couple sum circuit 131 through switch 135 to fine actuator 46 until the end of the seek, which occurs at one-quarter track pitch from the target track. At this point, track-follow circuit 112 is again re-energized and the velocity circuits 123 are disconnected from fine actuator 46.

Track capture, i.e, switching from track seeking to track following on the target track, is indicated by track counter 126 one-quarter track pulse supplied over line 145 to reset SEEK priming flip-flop 146. Initially, the SEEK signal from microprocessor 40 on line 136 set FF 146 to the active state causing switch 115 to move from follow terminal 116 to seek terminal 124. Resetting FF 146 at one-quarter track pitch-to-go causes a deactivating signal to be supplied over line 147 for moving the switch 115 from seek terminal 124 back to the follow terminal 116.

To assist in track capture, the dynamic range of power amplifier 117 is momentarily increased for supplying a maximal control signal over line 57 to fine actuator coil 46A. This additional control current ensures fast capture but is not desired for faithful track following operations. Accordingly, the one-quarter track pitch signal on line 145 actuates a monostable multivibrator, or other time delay circuit, MONO 148, to supply an actuating signal over line 149 to amplifier 117. This actuating signal causes the amplifier 117 dynamic range to be increased, electronically changing the dynamic range of amplifier 117 such as shown in FIG. 9.

It may be desired to verify that track counter 126 has faithfully counted the tracks, particularly when two pulses per track crossing are employed. To this end, decode circuit 113 supplies a signal which is the sum of all photo-currents from the elements of detector 62 over line 152 to track-counter circuit 126. This sum signal is in quadrature to the TES signal on line 63. Whenever the sum signal on line 152 has a maximum positive amplitude, then the beam 47 is in the center of a track being crossed. When two pulses per track crossing are employed, this means that the numerical content of track counter 126 should be even. If the track count is odd, then the track count is changed by unity for synchronizing the track count to actual track crossings.

For causing the the coarse actuator 36 to follow the fine actuator 46 motions, coarse positioner circuit 111 receives the relative position error (RPE) signal from detector 56 over line 58E. The RPE signal passes through summing node 154, wherein it is summed with a suitable reference signal on line 153, to reach circuit 155. Compensator and integrator COMP/INT 155 responds to the summed signal received from summing node 154 to supply a smoothed and integrated error signal to sum circuit 156, thence through power amplifier 157 causing coarse actuator 36 to move headarm 33 to follow the motions of fine actuator 36 motions. Such following operation reduces the error signal sensed by detector 56 in the relative movements of the headarm 33 and fine actuator 36. During seek operations, it is desired to actuate coarse actuator 36 to move headarm 33 more quickly for limiting the relative position error between the fine and coarse actuators 46, 36. To this end, the drive signal supplied to amplifier 117 for driving fine actuator 46 is also supplied over line 159 to feed-forward circuit 158. Feed-forward circuit 158 is a gain control and signal-smoothing circuit of usual design. Feed-forward circuit 158 supplies its output signal to sum circuit 156. The feed-forward circuit 158 output signal is added by sum circuit 156 to the signal from COMP/INT 155 for actuating coarse actuator 36 to a maximal actuation, particularly during acceleration mode. Thus, the fine servo loop during acceleration phase passes the effects of circuit 140 to the coarse servo lopp 111. Accordingly, both the fine actuator 46 and the coarse actuator 36 receive enhanced drive signals during the acceleration phase for ensuring both actuators 36 and 46 accelerate in a minimal time and following the desired velocity profile.

Figure 4:
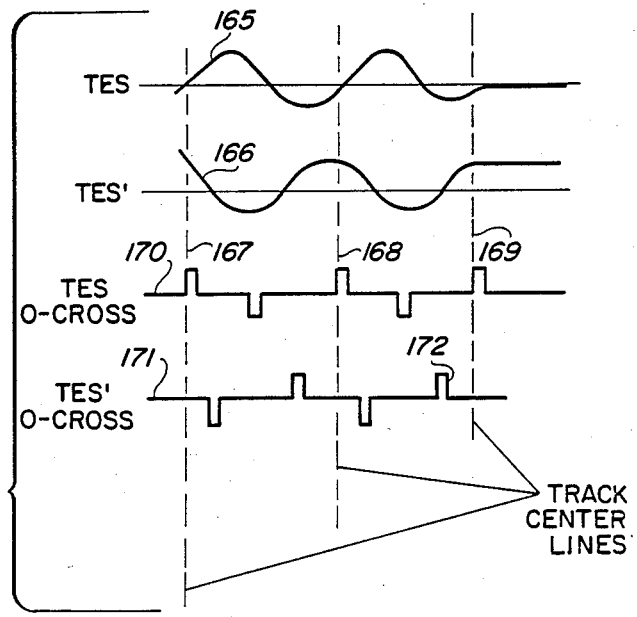
FIG. 4 shows idealized signal waveforms associated with one aspect of the FIG. 1 embodiment.

Referring next to FIG. 4, generation of the one-quarter track signal for switching from a seek mode to a track-follow mode is illustrated. The TES signal 165 found on line 63 has a positive-going track crossing at each of the track center lines 167, 168 and 169. The differentiated TES signal TES' 166 has its zero-access crossings always at a one-quarter track displaced position with respect to the TES signal. A zero crossing TES pulse 170 indicates the zero crossings of TES signal 165. In an identical manner, the zero crossing pulses of TES' 171 indicates the same relationship for the TES' signal 166. The pulse 172 indicates the one-quarter track position to go whenever the track center line 169 is representative of a target track. The signal 172 is supplied by counter 126 (distance to go is zero tracks with the count indicating zero) over line 145 for instituting track capture operations.

Figure 5:
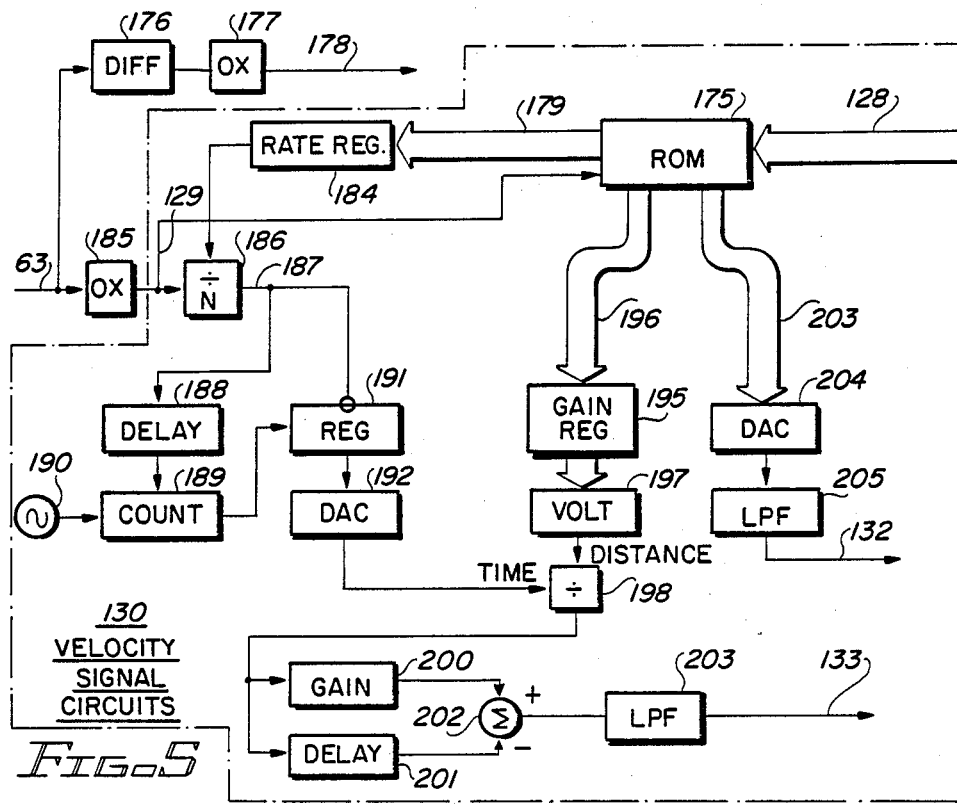
FIG. 5 is a simplified block diagram of a digital circuit which generates a digital indication of sensed velocity and desired velocity and converts same to analog form for use in controlling the positioning servo system.

Referring next to FIG. 5, the generation of the reference and measured velocity signals is described. The tracking error signal TES 165 (FIG. 11) on line 63 is applied to track-crossing circuits 125, which are partially illustrated in FIG. 5, as next described. Zero crossing circuit 0X 185 responds to the tracking error signal 165 (FIG. 4) to generate pulses 170 which are supplied to velocity circuits 130 over line 129. Tracking error signal 165 also travels to differentiator DIFF 176 for generating TES' signal 166. Zero crossing detector circuit 0X 177 responds to TES' 166 to generate pulses 171 supplied over line 178. These two inputs to velocity circuits 130 time the generation of the changes in the reference velocity signal supplied over line 132 and the changes in the measured velocity signal supplied over line 133 to analog sum circuit 131 of FIG. 3.

The distance-to-go digital signal is supplied from track counter 126 over cable 128 to velocity circuits 130 for actuating ROM 175 in coincidence with the pulses 170 on line 129. As a result of the actuation, ROM 175 has usual velocity profile tables to respond to the value change on cable 128 for creating a corresponding change in reference velocity. Then the signals supplied over cable 179 are changed to adjust, as later described, the frequency rate of division of the tracking pulses on line 129. Rate register 184 receives the frequency divisor factor on cable 179 and supplies that signal to divide-by-N circuit 186. Divide-by-N circuit divides the number of track-crossing pulses received over line 129 by N. Remember that two pulses may be used to represent one track crossing; i.e., each zero crossing of TES signal 165 is used in the speed measurement. N may vary from one to any arbitrary integer. For maximizing utilization of the next-described digital circuits, the divide-by-N circuit 186 output pulses supplied over line 187 determine the sensing interval for making changes in the measured velocity. The number N varies proportionally to the desired velocity profile stored in ROM 175; that is, the higher the speed or velocity, the higher the number N, which means that at the higher radial seek speeds, more tracks are crossed before any change is made in the measured velocity signal. The frequency-divided pulse on line 187 also enables the register 191 to receive the current count in counter 189, which represents the time for completing the velocity sampling. Delay circuit 188 allows the current count of a just-terminating measurement period to be stored in register 191. The output of delay circuit 188 then clears the count from counter 189 and begins the count for the next ensuing velocity-measurement period. This radial-speed indication, of course, varies with the frequency division factor N. The gain of the digital sensing circuit is adjusted, as next described, to accommodate counting a different number of track crossings when the velocities indicated by a series of constant repetitive rate pulses from oscillator 190.

Division circuit 198 adjusts the indication or velocity indicated by the time-representing number in register 191. ROM 175, in its tables, also includes an indication of the normalization of measured velocity indication to be effected. As N increases, the gain of the digital circuit has to increase, i.e., the effect of the stored number in register 191 must have a greater velocity significance than for lower values of N. Accordingly, ROM 175 for each time rate register 184 receives a different value of N, a corresponding charge-gain indication is supplied over cable 196 to be stored in gain register 195. Voltage circuit 197 converts the digital value stored in the gain register 195 to an analog value to become a numerator analog value in the next-described division circuit. The numerator voltage represents the radial distance traveled during the immediately preceding sample period. In a similar manner, digital-to-analog converter DAC 192 receives the numerical contents of register 191 and converts same into an analog-measured, velocity signal indicator, which is not yet normalized. Analog division circuit 198 receives the output time-representing signal of DAC 192, as the denominator for the analog division and the distance-representing output of voltage circuit 197 as the analog numerator. Division circuit 198 outputs a quotient signal, which is a true indication of measured velocity (distance divided by time), as digitally determined by the above-described circuits. The above-described circuits can be digital rather than analog.

Figure 12:
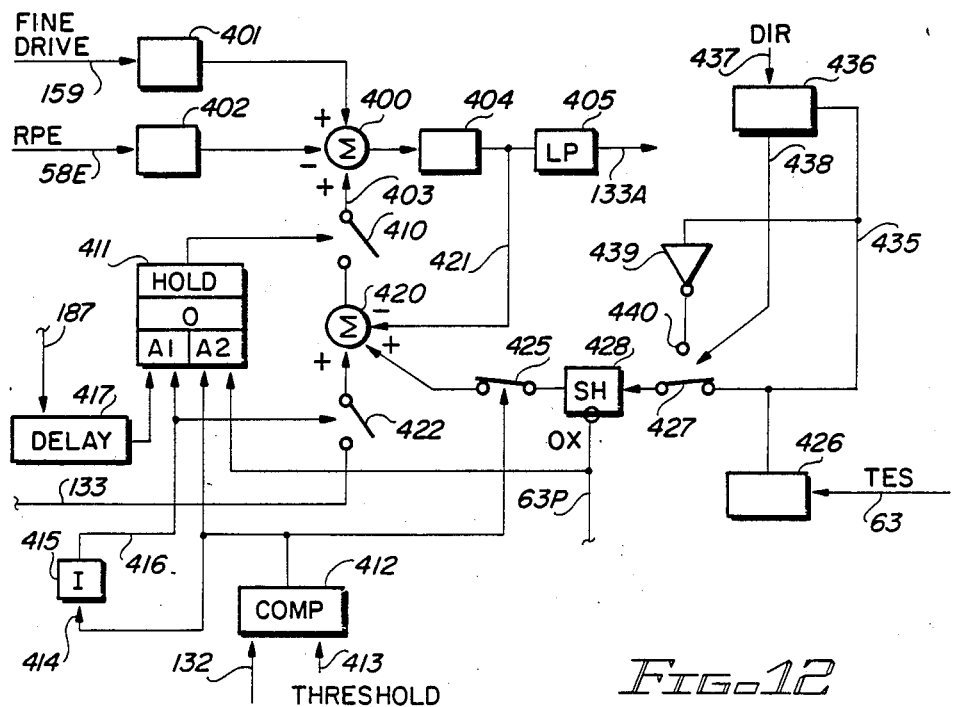
FIG. 12 is a simplified circuit diagram showing a velocity-state estimator which enhances the measured velocity signal used in the FIG. 3-illustrated servo circuits.

To correct for measurement delays, a velocity predictor estimates the velocity over the next sample period. This estimate is used as the measured velocity signal applied over line 133. Gain control circuit 200 modifies the quotient-indicated, velocity-measurement signal before applying same to summing circuit 202. Delay circuit 201 delays the quotient-indicating velocity-measurement signal by one sample period. It is preferred that the gain of the circuit 200 be two and the gain of delay circuit 201 is unity without velocity state estimation by the FIG. 12 illustrated circuits. When the FIG. 12 circuits are employed the gain of circuit 200 is 1.5 and the gain of delay 201 is 0.5. The output of sum circuit 202 is low-passed filtered by LPF circuit 203 for generating the measured velocity signal.

It is seen from above that the digitization of the velocity measurement uses a relatively-constant measurement period with the sample rate of track crossings being inversely proportional to the velocity profile (at higher velocity, fewer track crossings are passed to the measurement circuit, as performed by divide circuit 186) for enabling the modules of the digital values to be the same, while maintaining a lower dynamic range of operation for the analog circuits for more faithfully producing a measured velocity signal.

A reference velocity signal is supplied over bus 203 by ROM 175. That digital value is received and converted into analog form by DAC 204 and low-pass filtered by circuit 205 to supply an analog-reference velocity signal over line 132. It should be understood that ROM 175, for each distance to go, is enumerated by tracks to go as a value for the reference velocity signal, contents for register 195 and for register 184.

The practical embodiment values supplied to the gain register 195, DAC 204 and rate register 184 can be the same for a relatively large number of tracks to go, such that the curves illustrated in FIG. 2 can be faithfully emulated.

FIG. 6 is a simplified block diagram of compensator 142 of FIG. 3. From sum circuit 131, integrator 206 integrates the velocity error signal generated from the comparison of the reference and measured velocity signals from velocity circuits 130. A phase-lead compensating circuit 207 adjusts the integrated velocity error signal. Gain circuit 208 adjusts the gain such that servo drive signal matches the mechanical characteristics of the carriage system.

FIG. 7 details the track following circuit 112. The TES signal 165 (FIG. 11) from decode 113 (FIG. 3) is received over line 63. The circuit 218 difference signal goes to compensator 216, of usual design. The compensated difference signal from compensator 216 is supplied to low-frequency integrator 217 to generate a track following control signal on line 114. Analog summing circuit 218 subtracts the RPE signal on line 119 received from relative position sensor 56 from the received TES signal 165. The subtraction of the RPE signal compensates for a TES offset error caused by relative motion of the coarse and fine actuators. Relative position sensor 56 senses and indicates such relative motion which is fed forward to the track-following circuit 112, as shown.

FIG. 8 illustrates a track-counting control signal circuit using the signal generated, as later described, with respect to FIGS. 10 and 11. The TES (track error signal) and QUAD (sum signal of detector 62) signals, respectively, are supplied over lines 129 and 152. Direction circuit 220 is set by a SEEK command received over line 221. A seek direction signal is received either over a single line or over either a seek-in or seek-out line, 222 or 223. The QUAD and TES signals on lines 152 and 129 also travel to direction circuit 220. Direction circuit 220 responds to the seek circuit to do a direction of relative motion compare between the QUAD and TES signals. As is well known, in comparison to the radially in or out SEEK commands when the comparison of the QUAD and TES signals signify that the relative direction of motion is opposite to the commanded direction of motion, then unity is added to the counter to make the distance to go greater. On the other hand, when the direction indicated by the comparison of the QUAD and TES signals is in the same direction as the commanded direction, then unity is subtracted from the contents of counter 225 for indicating a reduction in distance to go. Direction circuit 220 supplies a same direction signal over line 226 to gate a delayed TES signal through AND circuit 227 then OR circuit 228 to subtract one from the contents of counter 225. The TES signal on line 129 is delayed by circuit 232 for time synchronization. In a similar manner, a retrograde or opposite motion signal is supplied over line 235 by direction circuit 220. Whenever the comparison of the QUAD and TES signals indicates a relative direction of motion opposite to that of the commanded direction of motion, the line 235 signal enables AND circuit 236 to pass the delayed TES signal from line 129 through OR circuit 237 to add one to the contents of counter 225. As will become apparent, the peak amplitude of the QUAD signal 152 signifies that the beam is at the center of the track. At this time, the value in counter 225 should be even. To change the count, the least-significant bit position of counter 225 is sensed. If such least-significant bit equals unity, then the value of the count is odd. This indication is supplied over line 240 to AND circuit 241. AND circuit 241 is enabled to pass a signal indicating the peak value of the QUAD signal on line 152. When an AND circuit 241 passes the QUAD signal upon an odd condition at track center, AND circuit 242 responds to the opposite direction indication signal on line 235 to pass the output of AND circuit 241 to add one to the count value of counter 225. Similarly, AND circuit 244 responds to the AND circuit 241 passed QUAD peak amplitude signal as enabled by the same direction indicating signal on line 226 to subtract an additional one from counter 225. FIG. 8 corresponds to circuits 125 and 126 of FIG. 3.

Referring next to FIG. 9, the control of power amplifier 117 by monostable multivibrator 148 at track capture time is described. Power amplifier 117 includes an input amplifier 250 which acts as a level shifter. The output signal from amplifier 250 actuates the power amplifier element 251 to supply the drive signal over line 57D to the fine actuator 46A. The voltage swing of the output of amplifier 250 is limited to a predetermined voltage swing about a reference voltage $V_R$ by a pair of oppositely-polled Zener diodes 252 and 253. Switch 254 is normally closed such that reference voltage $V_R$ limits the positive and negative excursions of the output of amplifier 550. At the quarter-track, pitch-to-go signal on line 145, the monostable multivibrator 148, shown as pulse generator 148 in FIG. 9, momentarily opens switch 254 as indicated by a dashed line 149. This action removes the limitation on voltage swing of the input to the power amplifier 251 for permitting a much larger voltage swing, thereby increasing the dynamic range of the amplifier 117. This dynamic range increase enables the power amplifier 117 to momentarily provide additional amplitude control signals to actuator 46A for creating a tighter control over the track capture operation. In one constructed embodiment, switch 254 was open for approximately 50 microseconds. This action significantly increases the capability of power amplifier 117 to provide a larger current amplitude to be applied to actuator 46A for rapid decelerations as required. Upon expiration of the timed pulse from generator 148, Zener diodes 252, 253 again limit the input-to-power amplifier element 251 during track-following mode.

Figure 10:
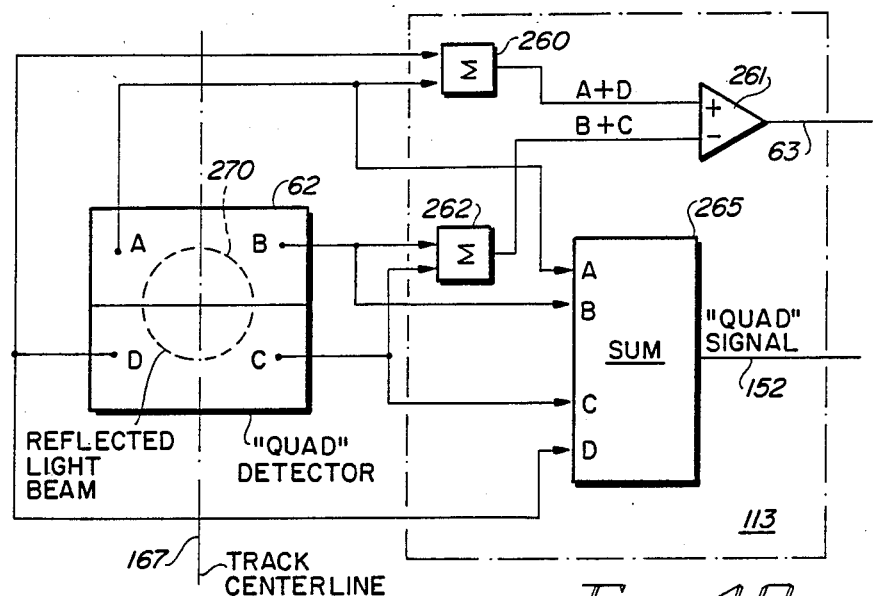
FIGS. 10 and 11 show the generation and the relationship of the tracking error signal and the quadrature signal used in accordance with the present invention.
Figure 11:
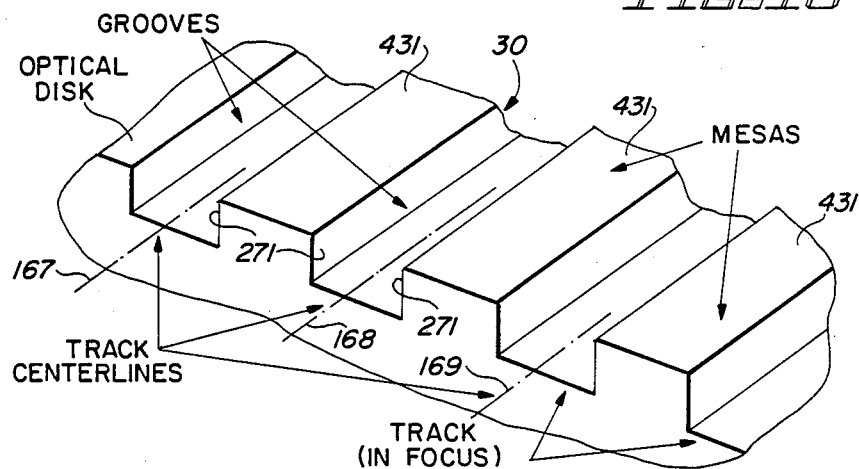
Figure 11:
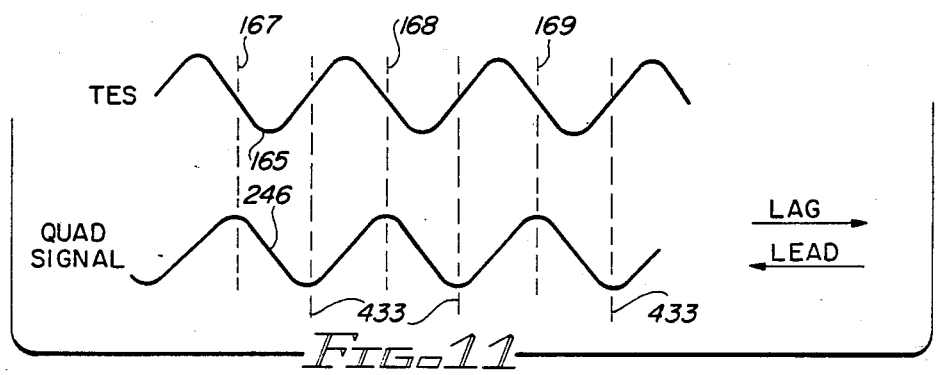

Referring next to FIGS. 10 and 11, the generation of a QUAD signal is described. QUAD detector 62 has four independent photo-responsive elements A, B, C and D. For generating a tracking error signal on line 63, the elements A and D are connected to analog current summing circuit 260 to supply the sum signal A+D to the positive input of differential amplifier 261. Similarly, elements B and C have their output signals connected to a second current summing circuit 262, which, in turn, supplies its sum signal B+C to the negative input of differential amplifier 261. The difference between the current sums of A+D and B+C provide the tracking error signal on line 63. QUAD detector 62 is the line that is shown such that the separation between the element pairs A and D, and the element pairs B and C lie along a track center line being followed, such as the track center line 167. The recording tracks can be located either in the grooves, as shown, or the mesa's 431. When recording is on the mesa's, then track following occurs on a mesa 431. During track following, the relative position of track center line 167 will move with respect to the elements A, B, C and D, thereby providing different light intensities to the element pairs for generating a tracking error signal truly indicative of the spatial relationship of the beam 47, with respect to a track being followed, for example. During track seeking, the TES signal 165 is generated, as best seen in FIG. 11.

The QUAD supplied over line 152 is merely a sum of the currents from all of the electrical elements A, B, C and D of QUAD detector 62. The QUAD is generated by sum circuit 265 which generates signal 246 of FIG. 11. Examination of FIG. 11 shows that the QUAD signal 246 is 90 degrees displaced from TES signal 165, thereby satisfying the quadrature requirements for indication of motion direction.

FIG. 11 also shows an abbreviated portion of the disk 30, wherein the tracks are shown as being aligned with the grooves of the groove media. The grooves are concentric circles on disk 30, shown as straight lines for all purposes of illustration only. Track center lines 167, 168 and 169 lie along the center of the respective grooves and correspond respectively to the track center lines shown in FIG. 4. As the light beam impinges upon the medium 30, and is focused to the tracks in the grooves, the maximum reflection light intensity is provided to the detector 62 as indicated by dashed line circle 270. As the beam moves crosswise of the track, the intensity of the light diminishes and through a zero axis crossing at the vertical boundaries between the grooves and the mesas, as indicated collectively by numeral 271. On top of the mesa, the track is out of focus causing the amplitude to be further reduced by the in-focus reflection, thereby resulting in a negative peak intermediate the tracks. The signal on line 152 is peak detected within AND circuit 241 to pass the odd signal on line 240. In a similar manner, direction circuit 220 peak detects the positive peak of QUAD signal 246 using known techniques.

Referring next to FIGS. 11 and 12, the illustrated velocity-state estimator circuit shown in FIG. 12 is interposed between line 133 (FIGS. 3 and 5) and summation circuit 131 for smoothing the measured velocity signal. This smoothing provides a continuous analog velocity signal throughout a seek operation. Such smoothing includes modeling the mechanical dynamic characteristics of the fine actuator and the relative-position error sensor 56. When the track-crossing frequency (high radial speed) during a SEEK exceeds a predetermined threshold, the digital velocity circuits are employed; while at speeds below the track-crossing frequency threshold, the TES signal on line 63 is employed for measuring the radial velocity. The FIG. 12-illustrated circuits selectively couple and modify the measured velocity signal on line 133 or the TES signal on line 63 to supply a continuous analog-type velocity indicating signal on line 133A which in FIG. 3 replaces the line 133 input to summation circuit 131.

In FIG. 12, summation circuit 400 receives three inputs to be summed for providing the estimated velocity signal on line 133A. A first input signal is received from the fine actuator drive signal on line 159 (the drive signal without the radial runout compensation effect provided over line 118 (FIG. 3). The fine actuator 46 drive current on line 159 is modified in circuit 401 by a model of the force constant of the fine actuator. A second input is the RPE signal on line 58E that is modified by the circuits 402. In a first modification, the RPE signal is modified by a model of the spring constant of the fine actuator 46, while in the second an independent modification portion of circuit 402, a model of the viscous damping constant of the fine actuator 46 modifies the line 58E RPE signal. The RPE effect on summation circuit 400 is to subtract or counteract the other two inputs. In a practical embodiment, the portions in circuits 402 respectively model the spring constant and the viscous damping constant may result in separate summation inputs to the summation circuit 400. The third input to circuit 400 on line 403 provides a timed velocity recalibration input from either line 133 or from line 63 depending upon the track-crossing frequency, as will become apparent. The RPE error signal from circuit 402 is subtracted from the sum of the first and third inputs, respectively, from circuits 401 and 403. Summation circuit 400 supplies its sum signal through compensation circuit 404 which modifies the summation circuit by an integral of the inverse of a model of the fine actuator 46 mass value. Compensator circuit 404 supplies its compensated signal through low-pass filter LP 405 to line 133A.

The actual measured velocity modification of the estimated velocity signal on line 133A is timed to coincide with the ends of respective velocity-measuring periods. Switch 410 times the modification of the estimated measured velocity throughout the seek operation. The timing is controlled by circuit 411 which holds electronic switch 410 closed for a predetermined period, such as by a monostable multivibrator indicated in circuit 411 by the word "HOLD". Circuit 411 has four inputs into two AND function circuits A1 and A2. Circuit A1 times the switch 410 whenever the digital velocity-measuring circuit is being implemented, i.e., above the track-crossing frequency threshold AND circuit A2 controls the timing of switch 410 when the TES signal on line 63 is used for generating the velocity signal, below the track-crossing frequency threshold. An OR circuit "O" passes the outputs of AND circuits A1 and A2 in a logic OR manner for actuating the HOLD portion of circuit 411.

Circuit 411 is controlled by comparator circuit 412. Comparator circuit 412 receives the reference velocity signal on line 132 (FIG. 3) for comparison with a track-crossing frequency threshold value received over line 413. Since the threshold signal on line 413 is a constant, it can be provided by a voltage divider or other suitable voltage or current source. Comparator 412 is of the switching type such that when the reference velocity on line 132 is less than the threshold signal on line 413, an actuating signal is supplied by comparator 412 over line 414; when the reference velocity signal on line 132 exceeds the threshold signal on 413, a de-actuating signal is supplied over line 414. The reference velocity signal on line 132 is representative of the track-crossing frequency. The actuating signal on line 414 is supplied to AND circuit A2 for passing the track-crossing signals received from line 63P to actuate the "hold" portion of circuit 411 for closing switch 410. AND circuit A1 is enabled to pass the end of measuring period signal on line 187 (FIG. 5) by inverter 415 inverting the non-actuating signal on line 414 to an actuating signal on line 416. The line 187 signal is delayed by circuit 417 to compensate for circuit delays. When the digital velocity circuit is providing the measured velocity signal on line 133, AND circuit A1 is actuated at the end of each of the measuring periods for timing the closure of calibrating switch 410.

Analog summation circuit 420 supplies the calibrate signal through switch 410 as the third summation input on line 403 for analog summation circuit 400. Line 421 couples the output of compensation circuit 404 as a subtractive input to summation circuit 420. The actual measured signals are supplied to summation circuit 420 respectively through either switch 422 or 425. Switch 422 is always closed when comparator 412 supplies the actuating signal over line 416 of measuring period signal on line 187 to pass the digital velocity measured signal on line 133 as a positive summation signal to summation circuit 420. Therefore, when the seek speed or velocity is greater than the threshold on line 413, the correction signal to summation circuit 400 is the difference between the measured signal on line 133 from the digital measuring circuit and the feedback signal on line 421.

When the seek speed is below the threshold value 413, the TES signal on line 63 is supplied to gain differentiation control block circuit 426. Circuit 426 supplies the gain adjusted TES signal to switch 427, thence to sample and hold circuit SH 428. Circuit SH 428 receives the input signal at each TES signal zero crossing (two zero crossings per track crossing) as represented by the signal on line 63P. Electronic switch 425 is always closed when comparator 412 supplies the actuating signal on line 414. Switch 410 supplies the timing control for the calibration of the measured velocity signal on line 133A.

Polarity corrections have to be provided for the velocity signal calculated from the line 63 TES signal. Referring next to FIG. 11, a portion of the grooved medium 30 is shown with track center lines 167, 168 and 169 being in the grooves with no tracks being on the mesas 431 intermediate the grooves. Tracking error signal 165 (TES signal on line 63) is shown in spatial relationship to the grooved media 30. The actual track-crossing signal locations are represented by the vertical lines 167–169 and the zero crossings of TES signal 165 on the mesas as represented by the lines 433. Depending on the relative direction of motion with respect to the groove or track crossings 167–169, the polarity of the signal supplied to switch 427 varies. Accordingly, the actual relative direction of the beam 47 as it crosses the tracks 431 has to be polarity reversed. To achieve this, the output signal of gain-adjusting circuit 426 is supplied over line 435 to direction circuit 436 which receives a direction indicating signal over line 437. The direction indicating signal on line 437 is the actual direction as determined by the comparison of the quadrature signal and the TES signal. Circuit 436 basically is a phase compare such that the control of switch 427 will always provide a properly-phased signal to circuit SH 428. Analog inverter circuit 439 polarity inverts the line 435 signal for supplying an inverted signal to terminal 440 of switch 427. The operation of the circuit is such that when the beam is relatively moving across the tracks as seen in FIG. 11 from left to right, all signal crossings will be positive. That is, the signal crossings at lines 433 will be polarity inverted rather to have the same polarity velocity indicating signal in SH 428. On the other hand, when moving from right to left, the track-crossing, velocity-indicating signals at lines 167–169 are polarity reversed.

While the invention has been particularly shown and described with reference to preferred embodiment thereof, it will be understood by those skilled in the art that various changes in form and details may be made therein without departing from the spirit and scope of the invention.

What is claimed is:

1. In a positioning system, a track-seeking servo for an optical recorder operatively supporting an optical medium having a plurality of signal-storing elongated tracks which are sensible by an optical beam of a sensing means and having a coarse positioning carriage mounted with respect to the optical medium for relative radial movements across the tracks for seeking access to a target track and relatively movably carrying a fine positioning carriage such that the fine carriage moves radially of the disk about a reference point on the coarse carriage, a relative sensor mounted on the coarse positioning carriage and being operatively coupled to the fine positioning carriage for sensing and supplying an RPE (Relative Position Displacement Error) indication of the relative displacement of the fine carriage from the reference point, said sensing means having lens means mounted on the carriage for supplying a TES (Tracking Error Signal) indication of an absolute position of the fine carriage with respect to a track on the optical medium which is being scanned by said optical beam;

the improvement including, in combination:

first and second track-seeking servo-control loops operatively coupled, respectively, to said fine and coarse carriages for effecting relative positioning motions between the carriages and the optical medium such that the carriages can radially cross the tracks on the optical medium, said second track-seeking loop being operatively coupled to said relative sensor for receiving said RPE indication and responding thereto to effect a relative motion of the coarse carriage to follow the track-crossing motions of the fine carriage, each of said loops independently and respectively having error means for generating first and second drive signals and said loops respectively including first and second output means, respectively responsive to the first and second drive signals and being coupled to said fine and coarse carriages, respectively to effect respective relative motions;

emphasis means in said first track-seeking loop and being coupled to said second track-seeking loop and receiving said first drive signal and being responsive to the first drive signal to supply an emphasized drive signal to said first and second output means; and first circuit means in said first servo loop coupled to the sensing means for receiving said TES indication and being responsive thereto to generate said first drive signal and including capture means coupled to the first output means for supplying a track-capture signal to the first output means for adjusting operation of the first output means upon imminent arrival of the fine carriage to said target track to enable said fine carriage to stop at said target track and including track crossing means for correcting the seek operation to accommodate track runout of the record medium such that the number of tracks yet to be traversed for the fine carriage to reach said target track is faithfully indicated in the first loop.

2. In the positioning system set forth in claim 1, further including, in combination:

a circuit in the first error means coupled to the relative sensor for receiving and responding to said RPE indication and coupled to the sensing means to receive the TES indication and comining same to generate and supply a velocity control signal to said first output means.

3. In the positioning system set forth in claim 1, further including, in combination:

said first output means having an actuator operatively connected to the fine positioning carriage and mounted on said coarse positioning carriage for effecting relative motions between the two carriages transversely to the longitudinal extent of the record tracks;

a power output amplifier in the first output means being electrically connected to said actuator for supplying positioning drive signals thereto and having input means electrically connected to said first output means including a connection to the emphasis means for receiving the first drive signal; and dynamic range means in the first output means electrically interposed between said input means and said first servo loop and being electrically coupled to the capture means to respond to said track capture signal to increase the dynamic range of the power output amplifier during any track capture.

4. In the positioning system set forth in claim 3, further including, in combination:

dynamic range reference means in said dynamic range means for indicating a desired dynamic reference limitation on the power output amplifier;

said dynamic range means having a pair of oppositely-poled Zener diodes extending between said input means and said dynamic range reference means for limiting the signal amplitude excursions in the input means to said desired dynamic reference limitation; and electronic switch means electrically-serially connected to said Zener diodes for alternately completing and opening an electrical circuit path between the input means and the dynamic range reference means which includes the Zener diodes respectively when the switch is closed and opened, the electronic switch means being controllingly coupled to the capture means for receiving and responding to said track-capture signal to open the electronic switch means at imminent arrival to a target track.

5. In the positioning system set forth in claim 4, further including, in combination:

track-counting means in the first servo loop and being coupled to said sensing means for receiving said TES indication and being responsive thereto for indicating a distance to go toward a target track;

seek initiate means coupled to the track-counting means for setting the track-counting means to an initial value representative of a desired number of the signal-storing tracks to be traversed to reaching the above-mentioned target track;

imminent arrival means in the track-counting means for responding to said first indication and the distance-to-go indication for generating a track-capture initiate signal;

said track-capture means being coupled to said track-counting means including said imminent arrival means for receiving and responding to said track-capture initiate signal for generating said track-capture signal.

6. In the positioning system set forth in claim 5, further including, in combination:

a pulse generator in the track-capture means connected to said track-counting means and being responsive to said track-capture initiate signal for generating said track-capture signal as a pulse of momentary duration.

7. In the positioning system set forth in claim 1, further including, in combination:

velocity profile means in the first servo loop for digitally indicating desired radial velocity values during track seeking;

said TES indication being an alternating signal having a zero axis with predetermined zero axis crossings;

first zero crossing means connected to said sensing means for receiving said TES indication and being responsive thereto to generate electrical pulses indicative of said predetermined zero axis crossings of the TES indication;

rate register means coupled to said velocity profile means and said velocity profile means storing a table of rate factors and corresponding velocity signal gain factors both of which are directly related to the speed indicated by the stored track transverse velocity profile and supplying the rate factor to the rate register means of predetermined values of said stored track transverse velocity profile, said rate factor increasing with increased stored track transverse velocity values;

a digital divider connected to the first zero axis crossings detector and to said rate register for dividing the number of zero axis crossing indicating pulses by the rate factor to produce a train of normalized track-crossing pulses;

track transverse velocity measuring means coupled to said digital divider and to said velocity profile means for receiving said gain factor and connected to said digital divider for receiving said normalized track-crossing pulses and being jointly responsive to said gain factor and to said normalized track-crossing pulses to supply a measured transverse track velocity signal; and compare means in said first servo loop coupled to said track transverse velocity measuring means to said velocity profile means for respectively receiving said measured transverse track velocity signal and said desired velocity signal to generate and supply said first error signal.

8. In the positioning system set forth in claim 7, further including, in combination:

said transverse track velocity measuring means having a pulse generator supplying constant frequency pulses;

a counter in the transfer track velocity measuring means coupled to the pulse generator for receiving and counting said constant frequency pulses;

a delay circuit in the transverse track velocity measuring means electrically coupling the first zero crossing detector to said counter for supplying said normalized pulses to the counter for resetting the counter to a reference value; and digital register means in the transverse track velocity measuring means coupled to the counter first zero axis crossing detector for responding to each of said normalized pulses to receive the current count value from the counter.

9. In the positioning system set forth in claim 8, further including, in combination:

a first digital-to-analog converter in the transverse track velocity measuring means connected to said digital register means for receiving the count value stored therein and supplying an analog normalized velocity signal;

a second digital-to-analog converter operatively connected to the velocity profile means for receiving said gain factor and converting and supplying same as an analog gain factor signal; and an analog divider circuit means electrically coupled to said first and second digital-to-analog converters for dividing the analog gain factor signal by the analog normalized velocity signal to generate said measured transverse track velocity signal.

10. In the positioning system set forth in claim 9, further including, in combination:

an analog predictive signal coupled to said analog divider circuit for receiving and adjusting the analog measured transverse track velocity signal for predicting measured velocity during the time elapsed between successive ones of said normalized track crossing pulses; and said velocity profile means changing said rate and gain factors a plurality greater than two times during predetermined track seeking such that the elapsed times between successive ones of said normalized track crossing pulses are substantially constant.

11. In the positioning system set forth in claim 1, further including, in combination:

a four-photoelement optical detector in the sensing means having its four elements arranged in a two-by-two array with one axis of the array being aligned with the signal-storing tracks longitudinal direction and splitting the elements into first and second pairs of elements, each pair of elements being on a respective side of said axis;

circuit means in the sensing means and being coupled individually to all of the elements, TES means in the circuit means for differentially combining the signal outputs of the first and second element pairs for generating said second indication, quadrature means in the circuit means coupled to all of the elements for combining the signals from all of the detector elements into a sum signal which is in quadrature with respect to said second indication during track seeking;

track-counting means in the first servo coupled to said sensing means for receiving said second indication and said sum signal, direction means in the track-counting means responsive to said second indication and said sum signal to generate a count change signal indicating the actual direction of the track-seeking motion, and a digital counter in the track-counting means coupled to the direction means for responding to the count change signal to change the track count therein; and seek command means supplying seek start, direction and number of tracks to seek signals and being connected to the direction means and to said counter for respectively actuating the direction means to produce a negative count value when the seek direction signal indicates the same direction of motion as said direction means and to produce a positive count value when the seek direction signal indicates a direction opposite to the direction of motion of said direction means and to supply said number of tracks to seek signal to the counter for presetting the counter for the commanded track seek, and the first servo loop including control means connected to said seek command means for responding to said seek start signal to condition the first servo loop for a track seek.

12. In the positioning system set forth in claim 11, further including, in combination:

radial-velocity generating means coupled to said track-counting means and being responsive to the track-counting means changes in the counter for indicating a measured relative radial velocity of the first positioning carriage with respect to the optical medium;

radial-velocity profile means coupled to the track-counting means for indicating a desired radial velocity based upon a current number of tracks to go as indicated by the counter in the track-counting means; and servo drive signal means in the first loop coupled to said radial velocity generating means, the radial velocity profile means and to the first output means for receiving and jointly responding to said indicated desired radial velocity and to said indicted measured radial velocity to supply a servo drive signal to said output means for servoing the radial velocity of the first positioning carriage to said desired radial velocity profile.

13. In the positioning system set forth in claim 1, further including, in combination:

first servo loop emphasis means in the emphasis means connected between the first output means and the servo drive signal means for amplifying the servo drive signal for driving the first servo loop to a greater response to the servo drive signal;

second servo loop emphasis means in the emphasis means connected between the first output means and said second servo loop for transferring a portion of the drive signal for the first servo loop to the second servo loop;

accelerate means in the first servo loop coupled to the servo drive signal means for receiving the servo drive signal and responding to the servo drive signal exceeding a predetermined threshold to actuate the first servo loop emphasis means to add power to the servo drive signal as supplied to the first output means and to disable the first servo loop emphasis means from changing the servo drive signal when the amplitude of the servo drive signal is below a given threshold; and said second servo loop emphasis means receiving both said servo drive signal which is not changed and the accelerate means changed servo drive signal.

14. In the positioning system set forth in claim 1, further including, in combination:

said error means including profile means indicating a desired velocity profile for each seek operation and supplying a reference velocity signal;

velocity measuring means in said error means and coupled to the sensing means for receiving said TES indication and generating a measured velocity signal from said TES indication;

smoothing circuit means coupled to said relative sensor and to said velocity measuring means for receiving said RPE indication and said measured velocity signal to subtractively combine the two signals to supply a smoothed velocity signal; and summing circuit means in said error means and being coupled to said smoothing circuit means and to said profile means for subtractively combining the smoothed velocity signal and the reference velocity signal to supply said first drive signal.

15. In the positioning system set forth in claim 14, further including, in combination:

drive feed means for coupling said first output means to said smoothing circuit means to supply said first drive signal thereto including modifying the first drive signal with a model of the fine carriage as a modified first drive signal; and said smoothing circuit means additively combining said modified first drive signal with said measured velocity signal in generating said smoothed measured velocity signal.

16. In the positioning system set forth in claim 15, further including, in combination:

velocity threshold means in the smoothing circuit means for indicating when a seek velocity is greater than a predetermined threshold;

first and second velocity measuring portions in said velocity measuring means;

said first measuring portion being coupled to said sensing means for receiving said TES indication, said TES indication being of alternating polarity with successive zero axis crossings, sampling means for sampling the velocity of the transducer at zero crossings of the TES indication, sample and hold means coupled to the sampling means for receiving the velocity indications and holding same until the next sampled velocity as a first measured signal;

said second measuring portion being coupled to said sensing means for receiving said TES indication, means for sensing the TES zero axis crossings and supplying pulses indicative of the crossings, means for frequency dividing the supplied pulses to indicate an elapsed time, said profile means having means supplying distance indicating signals for each frequency division, velocity means coupled to said profile means and to said frequency dividing means for combining said indicated elapsed time and distance to supply a second measured signal; and switch means coupled to the velocity threshold means, said first and second measuring portions and to said smoothing circuit means and being responsive to said threshold means indicating a velocity greater than said predetermined threshold to pass said second measured signal as said measured velocity signal to said smoothing circuit means and responsive to the velocity threshold means indicating a velocity less than said predetermined threshold to pass said first measured signal to said smoothing circuit means as said measured velocity signal.

17. In a positioning servomechanism having a plurality of possible stop-lock positions between two relatively movable, members, motive means operatively coupled to said members for relatively moving same, a servo control circuit coupled to the motive means for effecting predetermined relative motions of said members to a succession of predetermined relative desired stop-lock positions;

the improvement including, in combination:

power amplifier means having a given dynamically alterable dynamic range of operations and being electrically interposed between said control circuit and said motive means for supplying a power current to the motive means in response to said control circuit and normally operating in a first predetermined dynamic range of operation;

approach means in the control circuit for indicating an immediate proximity to approaching one of said stop-lock positions; and capture means electrically interposed between said approach means and said power amplifier means for responding to said immediate proximity indication to momentarily increase the dynamic range of operation of said power amplifier means.

18. In the positioning servomechanism set forth in claim 17, further including, in combination:

said power amplifier means having an input means connected to said control circuit;

dynamic range reference means in said power amplifier means for indicating a desired dynamic reference limitation on the power output amplifier and being connected to said input means for limiting the input signal amplitude excursions for causing the power amplifier means to operate in said first predetermined dynamic range of operation;

said dynamic reference means having a pair of oppositely-poled Zener diode extending between said input means and said dynamic range reference means for limiting the signal amplitude excursions in the input means to said desired dynamic reference limitation; and electronic switch means electrically serially connected to said Zener diodes for alternately completing and opening an electrical circuit path between the input means and the dynamic range reference means which includes the Zener diodes respectively when the switch is closed and opened, the electronic switch means being controllingly coupled to the capture means for receiving and responding to said track capture immediate-proximity indication to momentarily open the electronic switch means at imminent arrival to a desired stop-lock position.

19. In the positioning servomechanism set forth in claim 18, further including, in combination:

a plurality of machine-sensible indicia on one of said members and being spaced apart along a path of relative movement between said members, each of said stop-lock positions being at one of said indicia;

indicia-sensing means on the other member for supplying indicia passing signal each time the indicia-sensing means senses a one of said indicia;

indicia-counting means in the servo control circuit and being coupled to said indicia-sensing means for receiving said indicia passing signal and being responsive thereto for indicating a distance to go toward a desired stop-lock position;

seek-initiate means coupled to the indicia-counting means for setting the indicia counting means to an initial value representative of a desired number of the indicia are to be traversed to reach the above-mentioned desired stop-lock position;

imminent-arrival means in the indicia-counting means for responding to said indicia passing signal and the distance-to-go indication for generating a stop-lock capture initiate signal;

said capture means being coupled to said indicia counting means including said imminent arrival means for receiving and responding to said stop-lock capture initiate signal for generating said stop-lock capture signal.

20. In the positioning servomechanism set forth in claim 19, further including, in combination:

a pulse generator in the desired stop-lock means connected to said indicia counting means and being responsive to said desired stop-lock initiate signal for generating said stop-lock capture signal as a pulse of momentary duration.

21. In a machine-effected method of moving a transducer across a plurality of record tracks from an origin track to a target track, the method of measuring track-crossing velocity;

the machine-executed steps of:

detecting and indicating track-crossing velocity;

when the track-crossing velocity exceeds a predetermined track-crossing velocity, measuring the track-crossing velocity in periods of time during which a predetermined number of tracks are crossed and selecting said number of tracks to be crossed in a given period to vary within a range having a plurality greater than two of a given number of track crossings, including adjusting the number of tracks crossed during each sample period for each of the velocity measurements in predetermined change increments with changes in said track-crossing velocity; and when the track-crossing velocity is less than or equal to said predetermined track-crossing velocity, measuring track-crossing velocity at each track crossing.

22. In the machine-effected method set forth in claim 21, the machine-executed steps of:

supplying a stream of pulses having a constant frequency;

repeatedly selecting said given period as the track-crossing velocity changes so that the number of constant frequency pulses never exceeds a predetermined modulus;

resetting the constant-frequency pulse counting at the end of each said given period and restart the counting;

saving and holding the count of constant frequency pulses at the end of each said given period;

modifying the held count of constant frequency pulses by a rate factor which indicates a one of said ranges of given number of track crossings to produce a measured track-crossing velocity signal; and modifying the measured track-crossing velocity signal during the first ensuing given period following the given period during which the measured track-crossing velocity signal was generated to indicate velocity changes during such ensuing given period.

23. In a machine-effected method of moving an optical transducer across a plurality of optical record tracks on an optical medium from an origin track to a target track, the method of measuring track-crossing direction and velocity;

the machine-executed steps of:

providing a multiple-element detector arranged such that the optical record tracks lie along a line disposed between the predetermined ones of the elements in the detector;

shining a light beam onto the medium such that light reflected from the medium impinges on the two-element detector and such that variations in light intensity indicates a spatial relationship of the transducer with a nearest one of the said optical record tracks;

differentially comparing and electrically indicating the differential comparison of the light impinging respectively on the elements of the detector and indicating track crossings at determined zero axis crossing of the differential comparison electrical signal;

summing the light impinging on the elements and supplying an electrical indication of the summing as a signal in quadrature to the differential comparison electrical signal;

combining the electrical signals for indicating the relative direction of each of said track crossings; and counting the track crossings indicated by the differential comparison electrical signal and assigning a sign to the count representing a direction of track crossing as indicated by the phase relation of summed electrical signal to the differential signal.

24. In the machine-effected method set forth in claim 23, further including the machine-executed steps of:

in said track-counting step, assigning two counts per track crossing and changing the count by unity at each zero axis crossing of said differential comparison signal;

sensing when the differential comparison signal has a maximal amplitude of a predetermined polarity;

checking the track count to determine if the count is odd or even; and if the track count is odd, change the count to make it even.

25. In a servo-controlled positioning system having motive means for moving a sensing element across a plurality of machine-sensible indicia on a reference member and being evenly spaced apart along a path of travel of the sensing element, said positioning system being for stopping said sensing element on a first one of the indicia and for moving the sensing element along the path from the first one indicia as an origin indicia to a second one of the indicia spaced from the first indicia by a plurality of intervening ones of the indicia, said second one of the indicia being a target indicia; velocity servo means actuating the motive means to move the sensing element between said origin and said target indicia in accordance with a predetermined velocity profile directed along said path, velocity profile means indicating the desired velocity profile as a series of digital values;

the improvement including, in combination:

said sensing element supplying a tracking error signal TES indicating the relative position of the sensing element to the indicia along said path of travel having a sinusoidal shape during movement and having zero axis crossing of a first kind midway between the indicia and zero axis crossing of a second kind at the center of the indicia and supplying a second sinusoidal signal in quadrature with the TES signal;

digital counting means connected to the sensing element for responding to said TES signal to digitally count the passed indicia and supplying the current digital count value to the velocity profile means and said velocity profile means responding to the supplied digital count value to generate and indicate a digital sample rate value, said sample rate value being linearly related to the velocity profile and being representative of a number of said indicia passed does not exceed a given modulus and is greater than a predetermined number;

digital frequency dividing means connected to said velocity profile means for receiving said digital sample rate value and connected to said sensing means for receiving one of said sensing element supplied signals and responsive thereto to generate a digitally-indicated speed value which includes division of the number of zero axis crossings of said one sensing element supplied signal by said rate value; and said velocity servo means being connected to said frequency digital dividing means for receiving said digital speed value and being responsive to the digital speed value and to the desired velocity profile to servo the positioning of the sensing element close to the desired velocity profile.

26. In the system set forth in claim 25, further including, in combination:

said velocity servo means including servo error means coupled to said velocity profile means and to said frequency dividing means for receiving said desired velocity profile and said speed signal as digital values, said velocity servo means including digital-to-analog converters for respectively receiving said velocity profile and speed signal digital values and generate and supply analog equivalent signals of same, analog signal normalizing means connected to said digital-to-analog converters for receiving both of said supplied analog equivalent signals and combining the two analog signals into a speed-indicating analog signal; and analog prediction means receiving the speed-indicating analog signal for changing same in accordance with said velocity profile for predicting measured speed of the sensing means during a next ensuing elapsed time.

27. In a track-seeking servo system which servo positions a transducer to seek for a track on a record medium, the record medium and transducer being relatively moving along a first direction along the track length wherein the transducer scans the track and being relatively movable in a second direction transversely to said first direction, the transducer being relatively movably carried by a first carriage, said first carriage being relatively movably carried by a second carriage, said second carriage being relatively movably mounted on a frame, said record medium being relatively movably mounted on said frame, means for sensing and indicating the relative position of the transducer and said record member track, first control means having motive means for relatively moving the first carriage with respect to the second carriage for positioning the transducer along motions in said second direction, second control means having motive means for relatively moving the second carriage with respect to the frame and being connected to the first control for causing the second carriage to follow the motions of the first carriage;

the improvement including, in combination:

difference means in the first control for sensing and indicating the direction in the second direction of the relative position of said first and second carriages; and the first control having means connected to said difference means for adjusting the operation of the motive means of the first control in a direction opposite to the direction of motion indicated by said difference means.

* * * * *